(12) United States Patent
Hioki (10) Patent No.: US 8,810,185 B2
(45) Date of Patent: Aug. 19, 2014

(54) DRIVE CIRCUIT AND METHOD

(71) Applicant: Semiconductor Components Industries, LLC, Phoenix, AZ (US)

(72) Inventor: Kosaku Hioki, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/935,008

(22) Filed: Jul. 3, 2013

(65) Prior Publication Data

US 2013/0293180 A1 Nov. 7, 2013

Related U.S. Application Data

(63) Continuation of application No. 12/883,739, filed on Sep. 16, 2010, now Pat. No. 8,508,175.

(30) Foreign Application Priority Data

Sep. 18, 2009 (JP) .................... 2009-217477
Sep. 18, 2009 (JP) .................... 2009-217478
Sep. 18, 2009 (JP) .................... 2009-217479

(51) Int. Cl.
*G05B 19/00* (2006.01)
*G05B 11/00* (2006.01)

(52) U.S. Cl.
USPC .......................... 318/685; 318/686

(58) Field of Classification Search
USPC .............. 318/400.01, 400.3, 400.13, 318/400.32–400.34, 606, 685, 693–696
See application file for complete search history.

(56) References Cited

U.S. PATENT DOCUMENTS

| | | | |
|---|---|---|---|
| 4,219,767 A * | 8/1980 | Wimmer | 318/696 |
| 4,490,664 A | 12/1984 | Moriguchi | |
| 4,510,423 A * | 4/1985 | Iwasawa | 388/821 |
| 5,694,015 A * | 12/1997 | Luniewicz et al. | 318/611 |
| 6,021,097 A | 2/2000 | Kanno et al. | |
| 6,049,184 A | 4/2000 | Uggla et al. | |
| 6,509,709 B2 | 1/2003 | Kubozuka et al. | |
| 6,879,128 B2 | 4/2005 | Coutu et al. | |
| 7,453,230 B1 | 11/2008 | Kremin | |
| 2002/0024315 A1 | 2/2002 | Kubozuka et al. | |
| 2003/0042801 A1* | 3/2003 | Miyajima et al. | 310/36 |
| 2004/0189237 A1 | 9/2004 | Mamyoda | |
| 2005/0024007 A1 | 2/2005 | Coutu et al. | |
| 2005/0024008 A1 | 2/2005 | Yamada | |
| 2005/0116678 A1 | 6/2005 | Yamada | |
| 2006/0255760 A1 | 11/2006 | Yoshihisa | |
| 2008/0309274 A1 | 12/2008 | Thomson | |
| 2010/0188036 A1* | 7/2010 | Hioki et al. | 318/685 |
| 2011/0068732 A1 | 3/2011 | Hioki | |
| 2011/0080122 A1* | 4/2011 | Klemm et al. | 318/129 |

FOREIGN PATENT DOCUMENTS

| | | | |
|---|---|---|---|
| JP | 08037798 A | | 2/1996 |
| JP | 2005-346788 | * | 12/2005 |
| JP | 2006288056 A | | 10/2006 |
| JP | 2007-215271 A | | 8/2007 |

\* cited by examiner

*Primary Examiner* — Thomas Dougherty (57) ABSTRACT

A stepping motor includes two coils. A driver circuit drives the stepping motor by setting dissimilar phases of supply currents to these two coils. One terminal of one coil is connected to ground and another terminal is set to a high impedance state, and an induced voltage generated at that coil is detected as a voltage with respect to ground. Then, in accordance with the state of the detected induced voltage, the magnitude of motor drive current supplied to the two coils is controlled.

20 Claims, 6 Drawing Sheets

DRIVE CIRCUIT AND METHOD

The present application is a continuation application of prior U.S. patent application Ser. No. 12/883,739, filed on Sep. 16, 2010, by Kosaku Hioki, titled "DRIVER CIRCUIT" which is hereby incorporated by reference in its entirety, and priority thereto for common subject matter is hereby claimed.

CROSS-REFERENCE TO RELATED APPLICATIONS

The entire disclosure of Japanese Patent Application Nos. 2009-217477, 2009-217478 and 2009-217479 including specification, claims, drawings, and abstract is incorporated herein by reference.

BACKGROUND

1. Technical Field

The present invention relates to a driver circuit for a stepping motor, which includes two coils and rotates a rotor driven by the coils by the setting of dissimilar phases of supply currents to these two coils.

2. Background Art

Among the various types of motors available, one representative type of motor capable of precisely determining position is a stepping motor. Stepping motors are widely utilized in various apparatuses, for example, in focusing and anti-shake mechanisms in cameras and in paper feed mechanisms in office automation equipment.

The stepping motor is generally driven by changing the rotating position of the rotor by a current phase to two stator coils. Therefore, if the rotor is rotated in accordance with the phase of current to the coils, the rotor rotates a predetermined amount regardless of the amount of current to the coils. Accordingly, the amount of current to the coils is generally set sufficiently large so that the rotor can rotate reliably.

There are demands to set the power consumption in electric equipment as low as possible. These demands are particularly high in office automation equipment requiring high current or battery driven portable equipment. On the other hand, in the drive of stepping motors, setting the amount of current to a magnitude at which the rotor rotates reliably means extra current flows to the coils and extra power is consumed. Furthermore, motor drive at high power causes irregular rotor rotation and also causes vibration, noise, and heat generation.

SUMMARY

The present invention detects an induced voltage and controls a motor drive current in accordance with the induced voltage.

DETAILED DESCRIPTION

Embodiments of the present invention will be described hereinafter with reference to the attached drawings.

Overall Configuration

Figure 1:
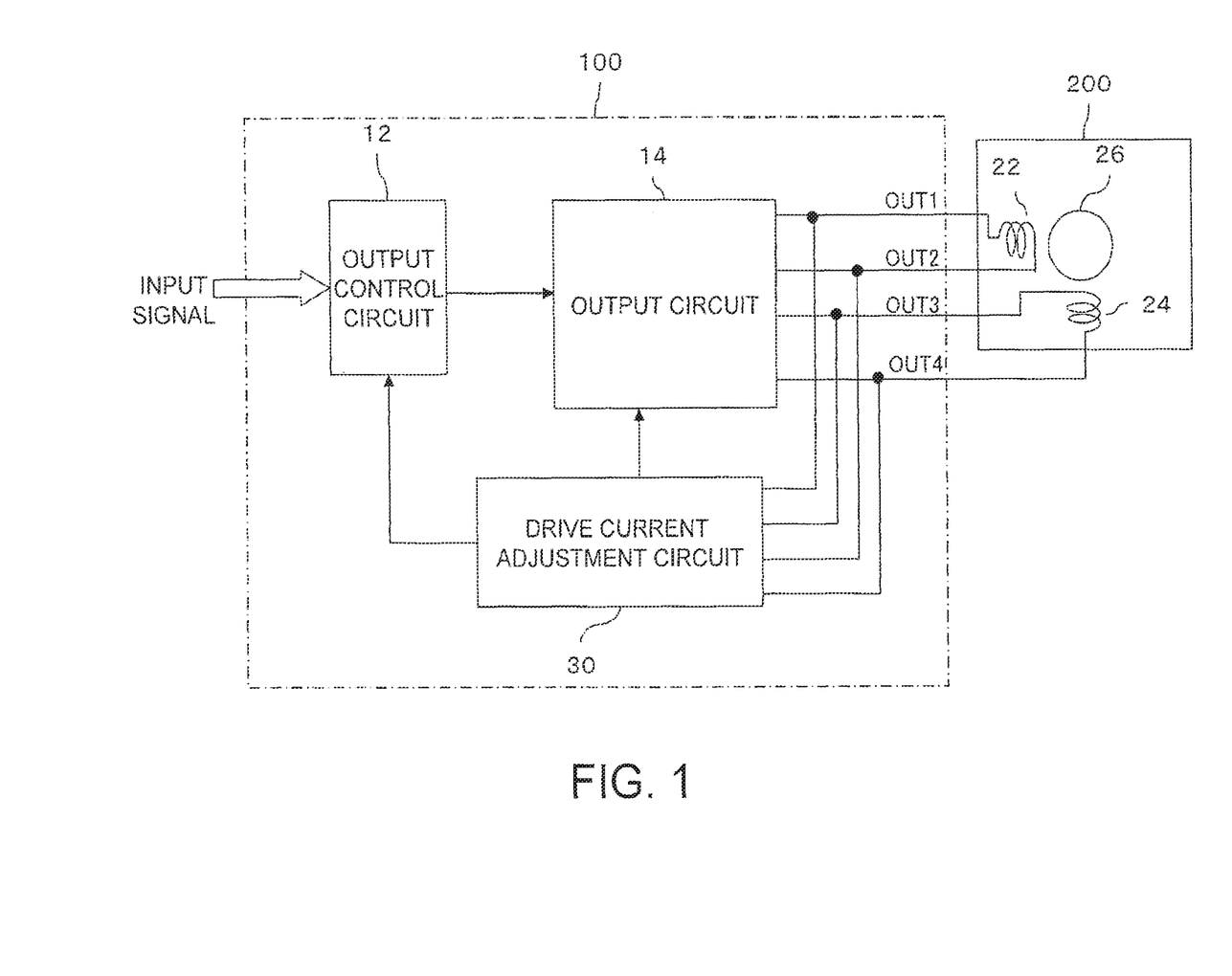
FIG. 1 shows an overall configuration of a system including a driver circuit and a motor.

FIG. 1 shows an overall configuration where a system is composed of a driver 10 and a motor 200. An input signal is input by the driver 100 and the driver 100 supplies a drive current to the motor 200 in accordance with the input signal. As a result, rotation of the motor 200 is controlled in accordance with the input signal.

Here, the driver 100 includes an output control circuit 12 and the input signal is supplied to the output control circuit 12. The output control circuit 12 determines the drive waveform (phase) at a predetermined frequency in accordance with the input signal and determines the amplitude of the drive current by PWM control to create a drive control signal. Then, the created drive control signal is supplied to an output circuit 14.

The output circuit 14 is composed of a plurality of transistors, the switching of which controls current from a power supply and generates motor drive currents, which are supplied to the motor 200.

The motor 200 is a stepping motor and has two coils 22 and 24 and a rotor 26. The two coils 22 and 24 are arranged so as to be positionally displaced at an electrical angle of 90° to each other. Therefore, the direction of the magnetic fields with respect to the rotor 26 at the rotor central angle is also displaced at an electrical angle of 90° to each other. Furthermore, the rotor 26 includes a permanent magnet, for example, and its position where it is stable is determined in accordance with the magnetic field from the two coils 22 and 24. Namely, regarding the angle of rotation of the rotor, by supplying alternating currents having a phase difference of 90° to each other to the two coils arranged at positions displaced by 90°, the current phases make it possible to move and rotate the rotor 26. Furthermore, at the timing of a specific current phase, stopping the change in current phase makes it possible to stop the rotor at a position in accordance with the current phase at that time. In this manner, the rotation of the motor 200 is controlled.

Voltages of outputs OUT1 to OUT4 of four current paths to the two coils 22 and 24 are supplied to a drive current adjustment circuit 30. The drive current adjustment circuit 30 determines current amplitude to the motor 200 on the basis of the voltages of outputs OUT1 to OUT4. Then, an adjustment signal for this current amplitude is supplied to the output control circuit 12. Therefore, the output control circuit 12 generates the drive control signal from the input signal and the adjustment signal.

Output Circuit Configuration

Figure 2:
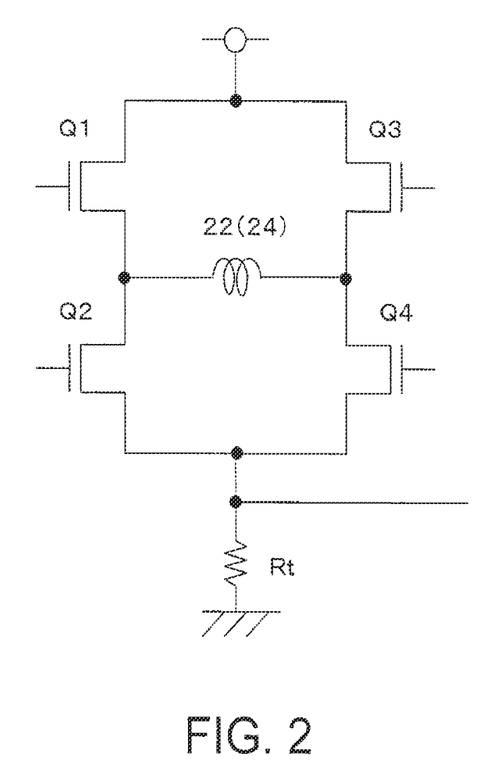
FIG. 2 shows a configuration of the output circuit.

FIG. 2 shows a configuration of part of the output circuit 14 and one coil 22 (24) of the motor 200.

In this manner, an arm composed of two transistors Q1 and Q2 connected in series and an arm composed of two transistors Q3 and Q4 connected in series are provided between the power supply and ground and the coil 22 (24) is connected to a midpoint between the transistors Q1 and Q2 and to a midpoint between the transistors Q3 and Q4. Then, by turning on the transistors Q1 and Q4 and turning off the transistors Q2 and Q3, a current flows in one direction to the coil 22 (24), and by turning off the transistors Q1 and Q4 and turning on the transistors Q2 and Q3, a current flows in the opposite direction to the coil 22 (24) so as to drive the coils 22 and 24.

Providing two of these circuits enables the currents supplied to the two coils 22 and 24 to be controlled individually.

Configuration of Drive Current Adjustment Circuit

Figure 3:
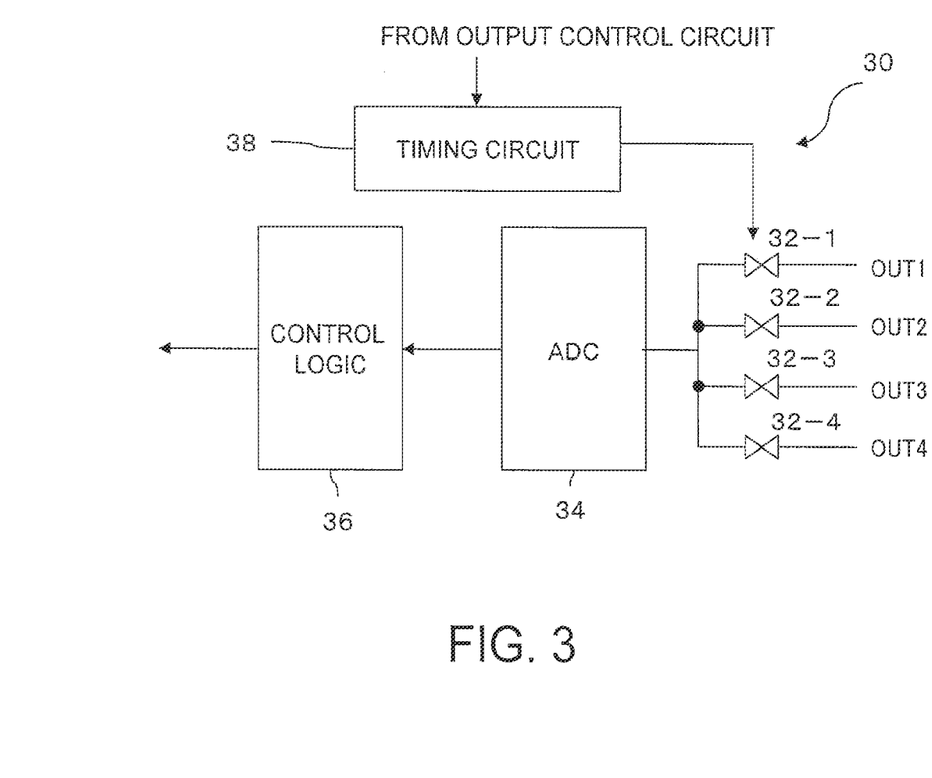
FIG. 3 shows a configuration of the drive current adjustment circuit.

An example configuration of the drive current adjustment circuit 30 is shown in FIG. 3. The voltages of OUT1 to OUT4 are input by an ADC 34 via the four switches 32, respectively. The ADC 34 converts a voltage selected by the switches 32 and sequentially outputs a digital signal. The output of the ADC 34 is supplied to a control logic 36. The control logic 36 determines the current amplitude to the motor 200 on the basis of the supplied voltage waveforms of OUT1 to OUT4 and supplies an adjustment signal for current amplitude to the output control circuit 12.

The output control circuit 12 creates the drive control signal in PWM control in accordance with the adjustment signal. Here, in the PWM control system, there are the direct PWM control system and the constant-current chopping system.

In the case of the direct PWM control system, PWM control is performed assuming the rectangular wave duty ratio and the current output are proportional. At this time, when an induced voltage develops at the motor, the actual current output value decreases. In the direct PWM control system, a current output value can be adjusted by controlling the rectangular wave duty ratio, which is to be a target, and a coefficient for adjusting the amplitude of the rectangular wave.

In the case of the constant-current chopping system, by detecting current flowing through a resistor Rt, current for driving the motor is detected and control is performed by varying the pulse width of the rectangular wave so that the current becomes the target value. In the constant-current chopping system, the current output value can be adjusted by varying the above-mentioned target value.

A driver circuit employing the direct PWM control system in the embodiment will be described.

Here, in the embodiment, the output voltages OUT1 to OUT4 to the four coil terminals are directly converted from analog to digital by the ADC 34.

For this reason, a timing circuit 38 is included. On the basis of drive phase of each coil, the timing circuit 38 controls switching of the switches 32 and controls switching of the transistors Q2 and Q4 in the output circuit 14. Namely, for coil 22 (24), one OUT terminal is connected to ground and another OUT terminal is open. As a result, an induced voltage appears at the OUT terminal on the open side. This is input by the ADC 34 and the ADC 34 outputs a digital value indicating amplitude.

Here, as described above, the output circuit for one coil 22 (24) has a configuration shown in FIG. 2. Then, the drive for one coil 22 (24) repeats a state where the transistor Q1 is PWM controlled while the transistor Q4 is on and a state where the transistor Q2 is turned on and the transistor Q3 is PWM controlled.

Figure 4:
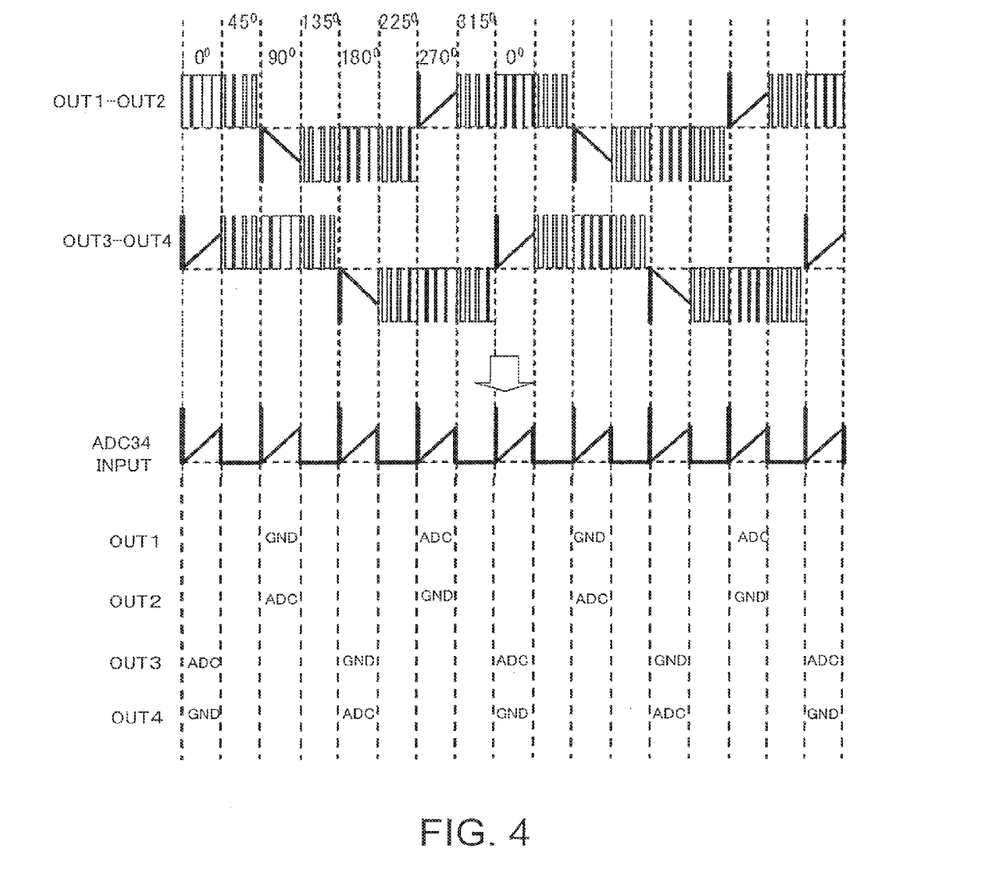
FIG. 4 shows outputs and control states of the output circuit.

FIG. 4 shows a voltage waveform between OUT1 and OUT2, which is a drive voltage applied to the coil 22, and a voltage waveform between OUT3 and OUT4, which is a drive voltage applied to the coil 24. In this manner, the drive waveforms to the two coils 22 and 24 differ in phase by 90° and the drive waveform of the coil 22 leads 90° compared to the drive waveform of the coil 24.

Then, in the example of the voltage waveform between OUT3 and OUT4 in FIG. 2, when transitioning from the state where the transistor Q4 is turned on and the transistor Q1 is PWM controlled to the state where the transistor Q2 is turned on and the transistor Q3 is PWM controlled, namely, in a step of 180° of the drive waveform, and when transitioning from the state where the transistor Q2 is turned on and the transistor Q3 is PWM controlled to the state where the transistor Q4 is turned on and the transistor Q1 is PWM controlled, namely, in a step of 0° of the drive waveform, the induced voltage is detected.

Namely, in this period, with the transistors Q1 and Q3 off, the transistor Q2 (or Q4) to be turned on in the next phase is turned on. It should be noted that the transistor Q4 (or Q2) is set to remain off.

In the example of FIG. 4, in the vicinity of electrical angle 0°, OUT1-OUT2 for the coil 22 is in the state where the transistor Q4 is turned on and the transistor Q1 is PWM controlled, and in the step of electrical angle 90°, the transistor Q2 is turned on and OUT1 connects to ground GND, the transistors Q1, Q3, and Q4 are turned off and OUT2 is set to an open state. As a result, the induced voltage at the coil 22 is obtained at OUT2 and by turning on switch 32-2 the induced voltage is input by the ADC 34. In the step of electrical angle 270°, the transistor Q4 is turned on and OUT2 connects to ground GND, and the transistors Q1, Q2, and Q3 turn off and OUT1 is set to an open state. As a result, the induced voltage at the coil 22 is obtained at OUT1 and by turning on switch 32-1 the induced voltage is input by the ADC 34. Since the phase of the coil 24 is delayed 90°, OUT3 becomes open at electrical angle 0°, OUT4 connects to ground, switch 32-3 turns on, and the induced voltage of OUT3 is supplied to the ADC 34, and at electrical angle 180°, OUT4 becomes open, OUT3 connects to ground, switch 32-4 turns on, and the induced voltage of OUT4 is supplied to the ADC 34.

The switching of the transistors Q1 to Q4 and the control of the switches 32 in the output circuit 14 for the coils 22 and 24 for induced voltage measurement are performed by the timing circuit 38 on the basis of switching phase signal from the output control circuit 12.

The induced voltage of the coil 22 (24) is obtained as a difference of both terminal voltages. However, in the embodiment, since one terminal of the coil 22 (24) is connected to ground when the induced voltage is measured, at the other terminal in the open state, a value of the voltage difference of both terminals of the coil 22 (24) is directly obtained. Therefore, it is not necessary to detect the voltage difference of both terminals of the coil with an op-amp and the circuitry becomes simple. Furthermore, the OUT on the open side is a terminal on the side where the induced voltage rises and the input to the ADC 34 is basically a positive voltage that can be directly converted into a digital signal at the ADC 34.

In this manner the induced voltage at a phase where the drive current waveform becomes 0 is sequentially detected by the ADC 34. Therefore, at the two coils 22 and 24, detection is performed four times in one electrical angle period of the motor. The detection period of the induced voltage is ⅛ period in the 1-2 phase excitation mode and ¹⁄₁₆ period in the W1-2 phase excitation mode employed in the embodiment.

Figure 5:
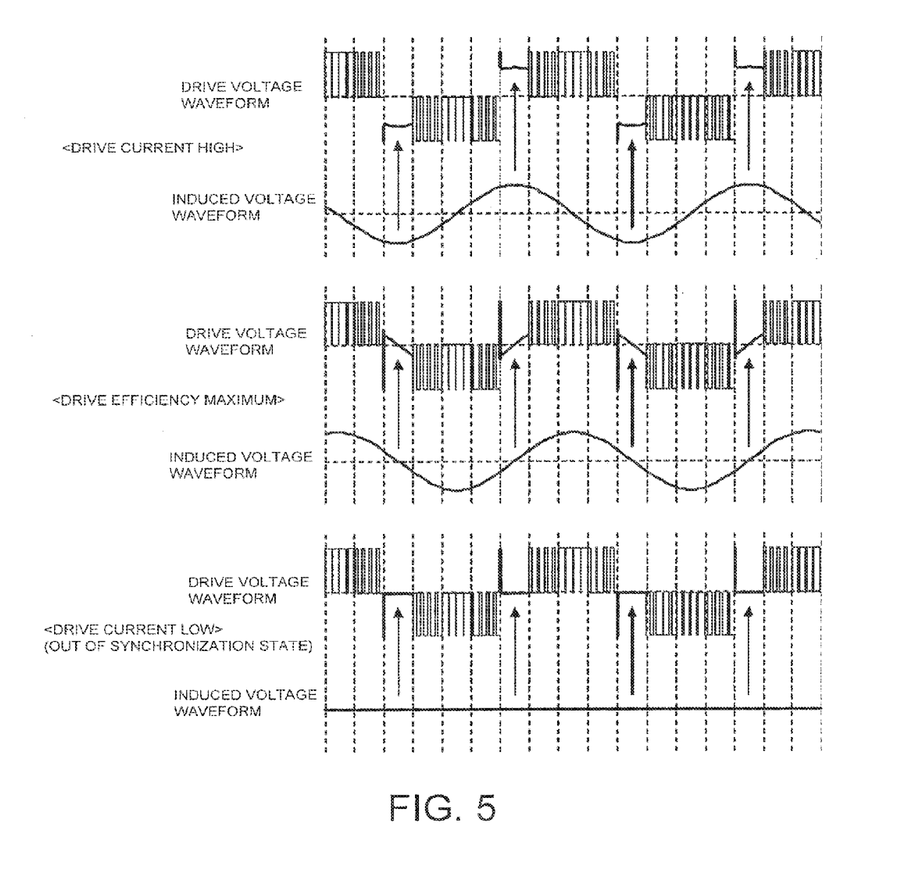
FIG. 5 shows relationships between drive current state and drive voltage waveform.

Next, FIG. 5 shows three examples of the drive voltage waveform and the induced voltage waveform in the one coil 22. The induced voltage waveform has a tendency of having the phase lead when the drive current is high. When the drive current is optimum, the phases of the drive voltage waveform and the induced voltage waveform substantially match. On the other hand, when the drive current is low, the drive of the rotor is disabled and enters an out of synchronization state so that the induced voltage waveform does not move from 0.

If the drive current is adjusted so that the induced voltage waveform has a phase where the drive efficiency is at a maximum, the risk of losing synchronization is large when the load of the motor fluctuates. Accordingly, although dependent on the actual usage situation of the motor, it is preferable not to perform control to attain a phase where the drive efficiency is maximum but preferable to perform control to attain a phase having a slight margin.

Determination Based on Induced Voltage Waveform

Figure 6:
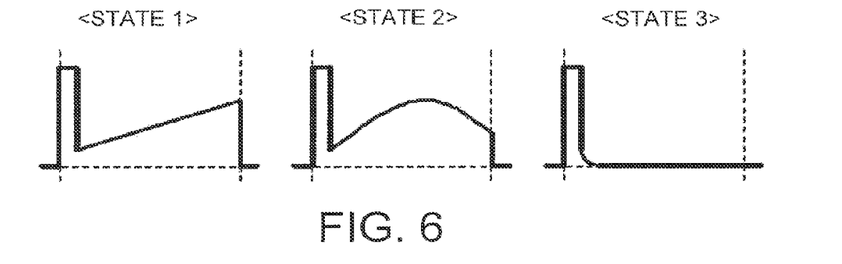
FIG. 6 shows states of the induced voltage waveform.

FIG. 6 shows examples of induced voltage waveforms in the induced voltage detection period. After kickback, state 1 shows a monotonic increase. This state is considered to have a zero cross positioned near the beginning of the detection period. Therefore, the drive current is considered to have a slight margin compared to the above-mentioned optimum (minimum) drive current. Therefore, either this is determined as appropriate or a further detailed determination becomes necessary. Namely, depending on the usage situation of the motor, if the load fluctuation thereof is comparatively large, the risk of losing synchronization is large. Thus, since the drive current amount is small, it can be determined that it is necessary to increase the amount.

The drive voltage after kickback in state 2 has a mountain shape. In this case, the phase of the induced voltage leads compared with the drive voltage waveform. Therefore, it is considered to correspond to the excessive drive current in FIG. 5 and it is determined the current amount should be decreased.

State 3 has no induced voltage after kickback. Therefore, there is no rotation of the rotor and an out of synchronization state can be determined.

In the control logic 36 of the drive current adjustment circuit 30, the output control circuit 12 is controlled on the basis of this determination result. In the case of state 3, the control logic 36 outputs a signal indicating the loss of synchronization was detected. The above-mentioned signal is received by a controller (not shown) for controlling the driver circuit 20.

In this manner, the embodiment determines the motor drive state in accordance with the induced voltage waveform in the induced voltage detection period and controls the motor drive current. Therefore, the drive state of the motor is accurately grasped and an appropriate motor drive control can be performed.

The control logic 36 performs determination from the digital data of the induced voltage. For example, it is preferable to perform the above-mentioned waveform determination from a comparison of three detection values. Here, the magnitude of the kickback differs depending on the magnitude of the coil current. Accordingly, it is preferable to perform the actual detection in the second half of the detection period to eliminate the influence of kickback as much as possible and detect the induced voltage waveform. For example, it is preferable to divide the detection period into eight periods and perform detection at 6/8, 7/8, and 8/8 period. At 8/8, it is also possible to detect loss of synchronization due to the voltage being 0V.

Estimation of Zero Cross

As described hereinabove, with the induced voltage waveform basically having a monotonic increase, a target phase is set in the embodiment so that the zero cross point exists prior to 4/8 of the detection period. Accordingly, in the case where the induced voltage waveform has a monotonic increase, it is preferable to obtain a slope from the detection values at 6/8 and 8/8, estimate and compare the zero cross with the target phase, and control the change in drive current. This waveform detection is performed in the control logic 36 of the drive current adjustment circuit 30 and the output control circuit 12 is controlled in accordance with the output from the control logic 36.

Figure 7:
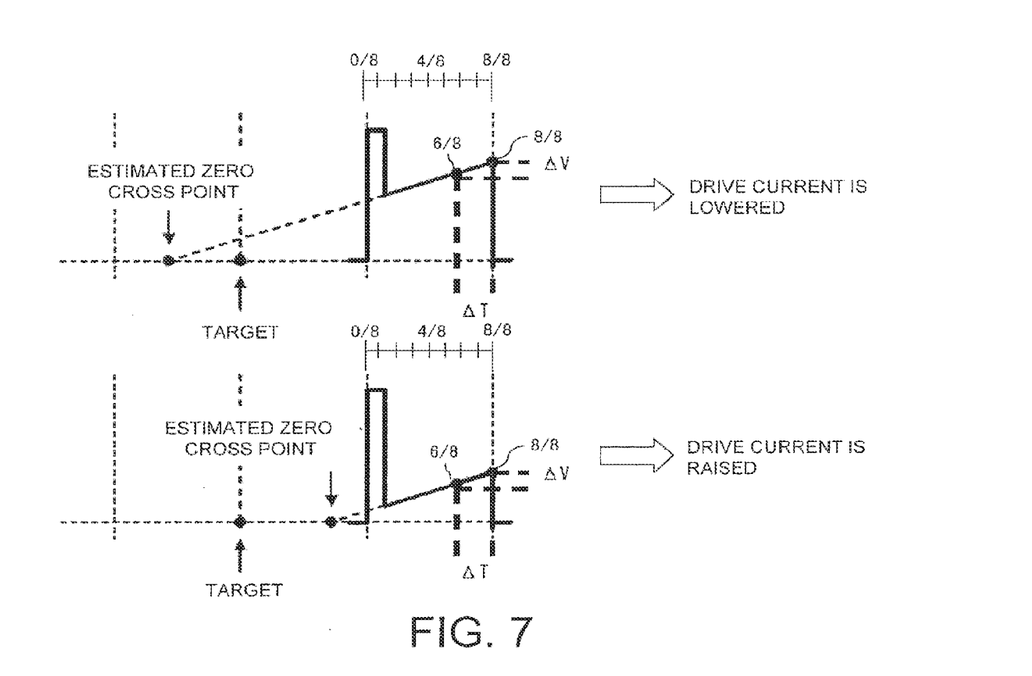
FIG. 7 shows an estimated zero cross point.

FIG. 7 shows states of estimating the zero cross point. For example, with regard to the induced voltage waveform in a state of monotonic increase after kickback, two points are detected. If the time between the two points is $\Delta T$ and the difference in induced voltages between the two points is $\Delta V$, the slope of the induced voltage waveform is $\Delta V/\Delta T$. For example, if the induced voltages at points 6/8 and 8/8 are detected when the above-mentioned detection period has been divided into eight equal parts, $\Delta T$ is 1/4 of the detection period, and if the induced voltage is V0 at 8/8 with $\Delta V \times 4 = V0$, the point at 0/8 is estimated to be the zero cross point.

In this manner, with regard to the induced voltage, detecting the induced voltage at the two points separated by set time $\Delta T$ enables the zero cross point to be estimated. Then, it is preferable to set a margin for the motor drive current from the motor load fluctuation, set a target for the zero cross point, and perform control so that the zero cross point approaches the target phase.

If the estimated zero cross point is delayed in comparison with the target phase, the current amount is increased, and if leading, the current amount is decreased. In the case where the difference with the target phase is large, the unit amount of the increase or decrease may be changed. In the case where the difference with the target phase is within a predetermined range, an increase or decrease need not be performed.

Furthermore, the change in the unit amount may be accomplished by changing the frequency and not changing the unit amount for one time. Namely, if the change of one unit amount is performed twice per detection, the gain doubles.

In particular, in the case where there is a tendency for insufficient current amount, it is necessary to restore the current amount early since there is a risk of loss of synchronization. For example, with respect to a normal range of control for the drive current, the unit amount (one step) is set to 1/256 and control (change of one unit amount) is performed once for one period of an electrical angle and near the loss of synchronization control is performed four times (change of four unit amounts) for one period. In the embodiment, detection is performed four times during one period (electrical angle of 360°) of the motor so that control can be performed four times, one for every detection. When changing only once, it is also preferable to perform control for increase or decrease only when the same determination result is obtained four times.

Furthermore, depending on the motor characteristics and magnitude of the drive voltage, it is necessary to change the control. Accordingly, it is preferable for the control gain (unit amount) to be variable.

Furthermore, depending on the motor characteristics, there are cases where the kickback width increases and the waveform detection of the induced voltage cannot be performed. In these cases where detection of the induced voltage cannot be performed, it is preferable to perform drive at maximum current and to not perform adjustment control of the drive current.

Furthermore, in the case of an application to systems having low fluctuations of load on the motor, the terminal for outputting the induced voltage is set only as OUT1. This can reduce the number of the switches 32 and the size of the driver 100.

Effect

According to the embodiment, high efficiency operation of the motor is possible. Therefore, efficient motor drive can be performed by reducing the power consumption. Furthermore, since the drive operation is smooth, the generation of vibration and noise can be suppressed. Moreover, the high efficiency operation yields the effects of suppressing the generation of heat and simplifying the cooling mechanism.

Furthermore, when detecting the induced voltage, the waveform can be detected by inputting the voltage directly into the ADC 34 without the need for obtaining the difference. Thus, op-amps can be omitted and the circuit can be simplified.

This high efficiency control has maximum effectiveness during normal operation where the rotation operation is continuous and it is preferable to perform another control operation, or the drive operation at maximum current, such as at startup. It is recommended that this control be performed only when the speed of rotation is a predetermined value or higher.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method for adjusting a drive current of a motor driver, comprising:
   generating an adjustment signal in response to the amplitude of the drive current;
   generating a drive control signal in response to the adjustment signal; and
   generating an adjusted drive current in response to the drive control signal, wherein generating the adjusted drive current includes using pulse width modulation to generate the adjusted drive current.

2. The method of claim 1, wherein generating the adjustment signal comprises:
   generating an induced voltage;
   converting the induced voltage to a digital signal; and
   determining an amplitude of the drive current in response to the digital signal.

3. The method of claim 2, wherein generating the induced voltage comprises:
   coupling a first node to a first reference potential; and
   placing a second node in a high impedance state, wherein the induced voltage is a voltage between the first and second nodes.

4. The method of claim 3, wherein generating the induced voltage comprises:
   coupling a third node to a second reference potential; and
   placing a fourth node in a high impedance state, wherein the induce voltage is a voltage between the third and fourth nodes.

5. The method of claim 2, wherein generating the adjustment signal comprises:
   selecting a zero cross point target value for the first induced voltage;
   estimating the zero cross point value; and
   configuring the adjustment signal to decrease the drive current in response to the estimated zero cross point value being less than the target value or increase the drive current in response to the estimated zero cross point value being greater than the target value, wherein the decreased drive current or the increased drive current serves as the adjusted drive current.

6. The method of claim 1, wherein using pulse width modulation to generate the adjusted drive current includes using one of direct pulse width modulation or a constant-current chopping system.

7. The method of claim 1, wherein generating the drive control signal comprises determining a phase of the drive current in response to an input signal.

8. The method of claim 7, wherein determining the phase of the drive current includes determining the phase at a predetermined frequency.

9. The method of claim 1, wherein generating the drive control signal further includes determining an amplitude of the drive current.

10. The method of claim 5, wherein generating the adjusted drive current includes using pulse width modulation to generate the adjusted drive current.

11. The method of claim 10, wherein using pulse width modulation to generate the adjusted drive current includes using one of direct pulse width modulation or a constant-current chopping system.

12. The method of claim 10, wherein generating the induced voltage comprises:
    coupling a first node to a first reference potential; and
    placing a second node in a high impedance state, wherein the induced voltage is a voltage between the first and second nodes.

13. The method of claim 12, wherein generating the induced voltage comprises:
    coupling a third node to a second reference potential; and
    placing a fourth node in a high impedance state, wherein the induce voltage is a voltage between the third and fourth nodes.

14. The method of claim 7, wherein generating the adjusted drive current includes using pulse width modulation to generate the adjusted drive current.

15. The method of claim 7, wherein generating the induced voltage comprises:
    coupling a first node to a first reference potential; and
    placing a second node in a high impedance state, wherein the induced voltage is a voltage between the first and second nodes.

16. The method of claim 15, wherein generating the induced voltage comprises:
    coupling a third node to a second reference potential; and
    placing a fourth node in a high impedance state, wherein the induce voltage is a voltage between the third and fourth nodes.

17. A method for adjusting a drive current of a motor driver, comprising:
    generating an adjustment signal in response to the amplitude of the drive current, wherein generating the adjustment signal includes generating the adjustment signal in response to the induced voltage monotonically increasing after kickback;
    generating a drive control signal in response to the adjustment signal; and
    generating an adjusted drive current in response to the drive control signal.

18. A method for adjusting a drive current of a motor driver, comprising:
    generating an adjustment signal in response to the amplitude of the drive current, wherein generating the adjustment signal further comprises:
    generating first, second, third, and fourth induced voltages; and
    sequentially converting the first, second, third, and fourth induced voltages into the digital signal;
    generating a drive control signal in response to the adjustment signal; and
    generating an adjusted drive current in response to the drive control signal.

19. The method of claim 18, wherein sequentially converting the first, second, third, and fourth induced voltages into the digital signal comprises switchably coupling the first, second, third, and fourth induced voltages to an input of an analog-to-digital converter.

20. The method of claim 18, wherein generating the adjusted drive current includes using pulse width modulation to generate the adjusted drive current.

\* \* \* \* \*